Figure 1:
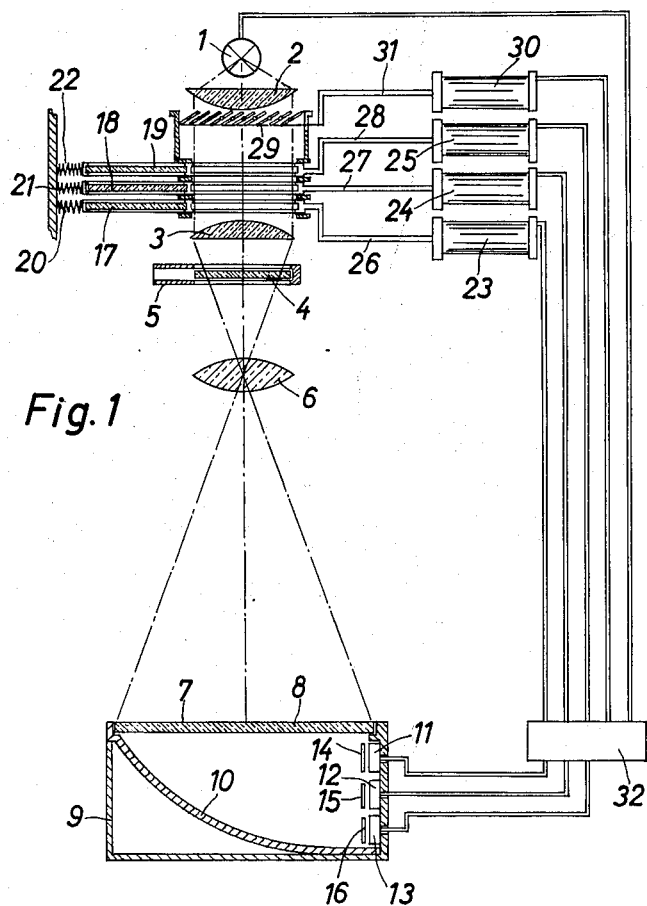

Jan. 18, 1966 P. FROST ET AL 3,229,569
PROCESS AND APPARATUS FOR PRODUCING
PHOTOGRAPHIC COLOR REPRODUCTIONS
Filed Feb. 17, 1960 3 Sheets-Sheet 1

INVENTORS.
PAUL FROST, HEINZ BERGER, RICHARD WICK
BY
Michael S. Striker
Attorney

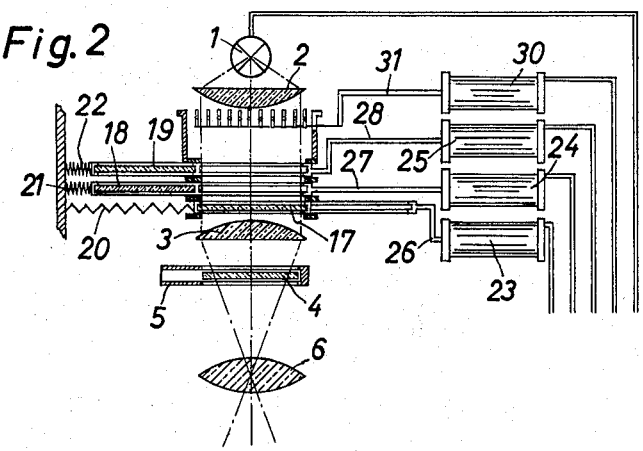
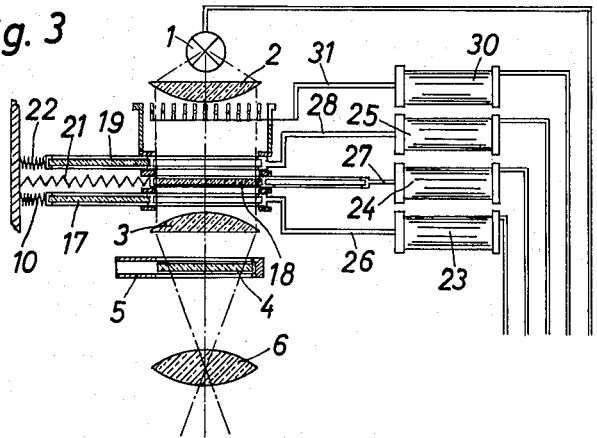
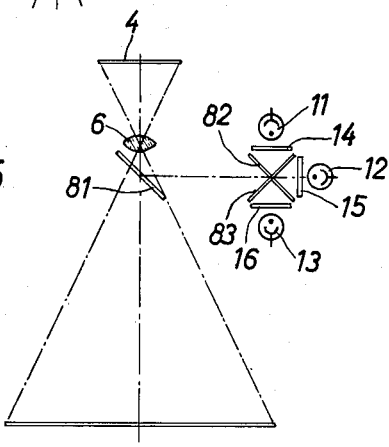

United States Patent Office 3,229,569
Patented Jan. 18, 1966

3,229,569
PROCESS AND APPARATUS FOR PRODUCING PHOTOGRAPHIC COLOR REPRODUCTIONS
Paul Frost, Seybothstr. 60, Munich, Germany; Heinz Berger, Gellertstr. 2, Leverkusen, Germany; and Richard Wick, Am Dullanger 3, Munich-Grunwald, Germany
Filed Feb. 17, 1960, Ser. No. 9,319
Claims priority, application Germany, Feb. 20, 1959, A 31,408
23 Claims. (Cl. 88—24)

The present invention relates to a process and apparatus for providing photographic color reproductions.

Such reproductions are made on enlargers or contact printing devices and the light is directed to a color transparency onto a light-sensitive copy sheet which is reproduced in this way.

A method and apparatus are already known in the case of which a source of white printing light and additive color filters are employed. In this case the complete color printing operation may take place in the form of three consecutive partial exposures using in each case one of the three additive color filters. In each of the three partial exposures a single color filter is inserted into the path of the printing light so that the duration of the complete printing operation is relatively long. It has therefore also already been proposed to employ instead of a white printing light source three printing lamps each of which emits light of one of the three additive primary colors and to switch them on simultaneously at the commencement of the color printing operation. The use of three printing lamps and the employment of the necessary means for superimposing the beams upon one another is, however, relatively highly expensive.

Moreover, it has also been proposed to employ in color printing apparatus subtractive color filters and to insert these into a white printing light beam when a predetermined amount of light of the complementary color has impinged upon the light sensitive material. However, subtractive color filters are relatively complicated and expensive to manufacture, more especially when the transmission capacity of these filters is to remain limited to the subtractive color concerned. When the transmission of the subtractive filters is not limited to one subtractive primary color, color falsification in the finished color prints is likely to take place in the use of these color filters in color printing apparatus.

One of the objects of the present invention is to provide a process and apparatus for producing photographic color prints which will be made by using an approximately white printing light source and color filters of the additive colors.

Another object of the present invention is to provide an apparatus of the above type which is fully automatic while at the same time being capable of controlling very precisely the extent to which the copy sheet is exposed to the several basic colors.

Still another object of the present invention is to provide a process and apparatus capable of exposing the copy sheet while applying additive color filters in such a way that the extent of exposure of the copy sheet to any one basic color is very precisely controlled.

With the above objects in view the invention includes, in a process for making photographic color reproductions, the step of applying additively to a copy sheet first a predetermined amount of the predominating basic color of a transparency which is being reproduced and then in succession the additional basic colors without simultaneously applying the additional basic colors to the copy sheet.

Also, with the above objects in view the invention includes, in an apparatus for producing photographic color reproductions, a copy sheet support and directing means for directing light from a source of white light along a given axis to the copy sheet support to expose a copy sheet thereof. A transparency support is provided for supporting a color transparency in a position extending across this axis between the source of white light and the copy sheet support. A plurality of measuring means cooperate with the copy sheets support for respectively measuring the amounts of the basic colors of the transparency which are applied to a copy sheet from the copy sheet support by the passage of the white light through the transparency. A plurality of color filters are provided respectively corresponding to the several basic colors, and a support means supports these filters for movement to an operating position extending across the above axis between the light source and the copy sheet support. In accordance with the invention a moving means cooperates with the several filters and is responsive to the above measuring means for moving into its operating position a color filter different from the predominating basic color of the transparency after a predetermined amount of this latter basic color has been measured by one of the measuring means.

Figure 4:
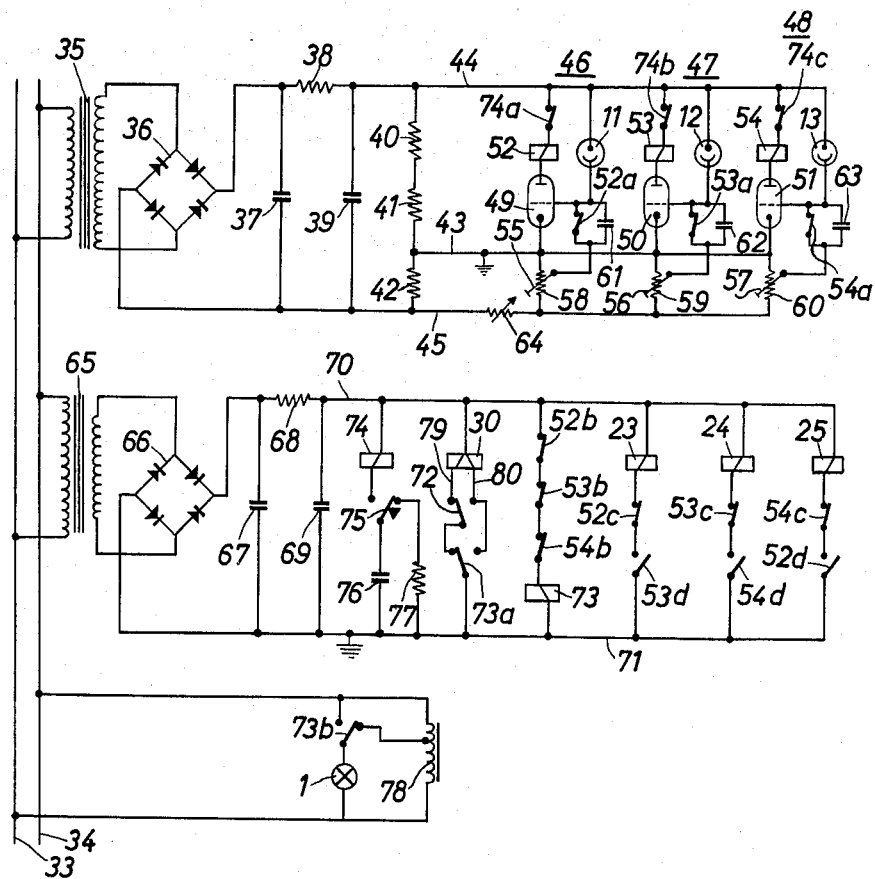

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which one possible embodiment of a structure according to the invention and capable of carrying out the process of the invention is schematically illustrated. In the accompanying drawings, FIG. 1 is a part diagrammatic, part sectional elevation of a color printing apparatus, FIG. 2 is part of a similar representation to FIG. 1, showing the apparatus in a particular operating position, FIG. 3 is similar to FIG. 2 showing a further operating position, FIG. 4 is a circuit diagram of the apparatus of FIG. 1 and FIG. 5 is a diagrammatic elevation of a variation of the photocell arrangement.

Referring to the drawings, in FIG. 1 the illumination means of an enlarger comprises a light source 1 and a double condenser 2, 3. The light source 1 emits light of all three additive primary colors, and, therefore, approximately white light. A color transparency 4 is arranged in a negative holder 5 and an image thereof is produced at a printing surface 7 by means of an objective 6 diagrammatically represented as a single lens. The printing surface 7 is the surface of a translucent plate 8 which is a component part of a printing easel 9 having the form of a flat housing. This housing contains a reflector 10 which collects and deflects printing light which has penetrated printing paper placed upon the plate 8 and the said plate itself, onto laterally arranged photocells 11, 12, 13 which are preferably of the photomultiplier type.

In front of the photocell 11 is arranged a blue filter 14, in front of the photocell 12 a green filter 15 and in front of the photocell 13 a red filter 16. Accordingly the photocell 11 is only sensitive to blue light, the photocell 12 only to green light and the photocell 13 only to red light.

Between the lenses 2, 3 of the double condenser, mounts are arranged for additive color filters 17, 18, 19 of which filter 17 is green, filter 18 red and filter 19 blue. As is apparent from the drawing, a suitable framework is provided with guides for the several filters 17, 18, 19. Each of these filters is loaded by a tension spring 20, 21, 22 respectively, which are anchored to a fixed portion of the apparatus and tend to maintain the color filters out of the path of the printing light beam, as shown in FIG. 1.

To each of the color filters 17, 18, 19 corresponds a solenoid 23, 24, 25 respectively, of which the armatures 26, 27, 28 are arranged alongside the filter mounts. On energizing one of the solenoids, the corresponding color filter is brought into the printing light beam, see FIGS. 2 and 3. Instead of the solenoids 23, 24, 25, electromagnets of other construction, servomotors or the like may be employed as means for moving the filters.

To each of the three photocells 11, 12, 13 corresponds a separate exposure regulating device. As further described below, the exposure regulating device corresponding to the blue-sensitive cell 11 controls the green filter 17 by way of the solenoid 23. The exposure regulating device corresponding to the green-sensitive photocell 12 controls the red filter 18 by way of the solenoid 24 and the exposure regulating device corresponding to the red-sensitive photocell 13 controls the blue filter 19 by way of the solenoid 25. The proportioning circuits for the additive color components of the printing light thus have additive color filters corresponding thereto in cyclic sequence.

Between the condenser lenses 2, 3 there is further arranged a venetian blind shutter 29 of known construction, the pivotable slats of which are together controlled by the armature 31 of an electromagnet 30 provided with two windings and being effective in two opposite directions.

The exposure regulating devices and the corresponding devices for the control of the relevant color filters and also the control devices for the printing lamp 1 and the shutter solenoid 30 are shown diagrammatically only in FIG. 1 by the rectangle 32 but are indicated in detail in the circuit diagram of FIG. 4.

As is seen from FIG. 4, leads 33, 34 of an alternating current mains supply are connected to the primary winding of a transformer 35 of which the secondary winding provides an alternating potential of about 300 volts. This is rectified by the four-way rectifier 36 and then smoothed by the filter elements 37, 38, 39. A potential divider 40, 41, 42 is so arranged that with reference to an earthed conductor 43 a conductor 44 has a direct potential of about +200 volts and a conductor 45 a direct potential of about −100 volts.

To these conductors are connected in parallel three photoelectric exposure regulating devices 46, 47, 48. Each comprises a valve 49, 50, 51 respectively, preferably in the form of a thyratron, in each of the anode circuits of which is arranged a relay 52, 53, 54. Between the grid of each valve and the conductor 44 is the corresponding photocell 11, 12, 13 respectively, while between the grid of each valve and tapping points 55, 56, 57 of potentiometers 58, 59, 60 respectively, which are connected up between cathode and negatively biased conductor 45, are arranged time-circuit capacitors 61, 62, 63. In parallel with the latter are contacts 52a, 53a, 54a which are controlled by the relays 52, 53, 54 of the respective regulating devices. As described in more detail below, the regulating devices 46, 47, 48 interrupt partial exposures of the printing material when predetermined quantities of light defined by the sensitivity of the regulating devices and corresponding to the primary colors, have impinged upon the corresponding photocells 11, 12, 13.

The potentiometers 58, 59, 60 may be used for color proportioning or color correction while a variable resistance 64 common to all the regulating devices can be used for density adjustment or correction. Obviously instead of each of the potentiometers 58, 59, 60 and the resistance 64 several potentiometers or variable resistances may be used.

Connected up to the alternating supply mains 33, 34 is a further transformer 65 of which the secondary winding provides a potential of about 60 volts. After rectification by a four-way rectifier 66 and smoothing by filter elements 67, 68, 69, this potential is supplied to conductors 70, 71 between which are arranged in parallel the solenoids 23, 24, 25 which are employed for control of the color filters 17, 18, 19.

Between the conductors 70, 71 there is further arranged the electromagnet 30 of the shutter 29, in the circuit of which is an inspection light switch 72.

Between the conductors 70, 71 are arranged in parallel a relay 73 and a relay 74 with a release switch 75 and a capacitor 76. The capacitor 76 can be connected up to a resistance 77 through the release switch 75. The release relay 74 controls contacts 74a, 74b, 74c in the circuits of the photoelectric control devices 46, 47, 48.

In addition to controlling the already mentioned contacts 52a, the relay 52 of the exposure regulating device 46 also controls a contact 52b in the circuit of the relay 73, a contact 52c in the circuit of the magnet 23 and a contact 52d in the circuit of the magnet 25. In an analogous manner the relay 53 of the exposure regulating device 47, in addition to controlling the contact 53a, controls a contact 53b in the circuit of the relay 73, a contact 53c in the circuit of the magnet 24 and a contact 53d in the circuit of the magnet 23. Similarly the relay 54 of the exposure regulating device 48, in addition to controlling the contact 54a, controls a contact 54b in the circuit of the relay 73, a contact 54c in the circuit of the magnet 25 and a contact 54d in the circuit of the magnet 24. The contacts 52b, 53b and 54b are arranged in series. In a similar manner the contacts 52c 53d, the contacts 53c, 54d and the contacts 54c, 52d are respectively connected in series.

The relay 73 controls a contact 73a in the circuit of the shutter magnet 30 and a contact 73b in the circuit of the printing lamp 1, which is connected up to the alternating current mains 33, 34. By means of the contact 73b, an inductor 78 can be brought into the circuit of the printing lamp 1, thus reducing the current through the lamp 1 when it is intended to be employed as an inspection lamp.

In the ready-for-use position of the color printing apparatus shown in the drawings, the color filters 17, 18, 19 and the shutter 29 take up the positions shown in FIG. 1 while the contacts of the electrical devices take up the positions shown in FIG. 4. Current thus passes through the valves 49, 50, 51, so that the relays 52, 53, 54 are energized and the printing lamp 1 switched on. Since however the magnet 30 is energized over the branch lead 79 and therefore the shutter 29 is closed, no light reaches the negative plane of the apparatus. The relay 73 is energized.

When, after insertion of a color transparency 4 into the holder 5, inspection light is required, the switch 72 is thrown whereby the magnet 30 becomes energized over the branch lead 80 and the shutter 29 is opened. On returning the inspection light switch 72 to its original position, the magnet 30 is again energized over the lead 79 and the shutter 29 is closed again.

After placing the printing paper on the plate 8 of the easel 9, the release switch 75 is thrown for a short time, as a result of which the relay 74 receives a short current impulse during charging of the capacitor 76 and the contacts 74a, 74b, 74c are opened for a short time. As a result, the valves 49, 50, 51 are extinguished and the relays 52, 53, 54 deenergized. They remain deenergized after the contacts 74a, 74b, 74c fall back into their original positions, since the grids of the valves 49, 50, 51 are negatively biased with respect to their cathodes.

When the relays 52, 53, 54 become deenergized, the contacts 52b, 53b, 54b are opened, as a result of which the relay 73 is deenergized and the contacts 73a, 73b, changed over. Thereby the full potential is applied to the printing lamp 1 and the magnet 30 is energized over the lead 80 whereby the shutter 29 is opened and exposure of the printing material commences. Since none of the filters 17, 18, 19 has been introduced into the path of the printing light, the printing material receives light of all three additive primary colors blue, green and red.

In addition, at the moment of deenergizing the relays 52, 53, 54 the contacts 52a, 53a and 54a are opened and the time circuit capacitors 61, 62, 63 become charged under the influence of the photocurrents of the photocells 11, 12, 13 corresponding to the respective illumination strengths. This charging operation commences simultaneously for all three capacitors. In addition at the moment of deenergizing the relays 52, 53, 54, the contacts 52c, 53c, 54c are opened and the contacts 52d, 53d, 54d closed.

It will be assumed that the color transparency has such a color composition that it is most transmissive for blue light and that the capacitor 61 of the exposure regulating device 46 has reached the potential necessary for the ignition of the corresponding valve before the capacitors 62, 63 of the exposure regulating devices 47, 48. As soon as this potential has been reached and thus a predetermined quantity of blue printing light has impinged upon the printing material, the valve 49 becomes ignited and thus energizes the relay 52, whereby the contacts 52a, 52b, 52c are closed and the contact 52d is opened. As a result the magnet 23 is energized so that the green filter 17 is brought into the printing light beam, see FIG. 2. The exposure of the printing material now proceeds under the green filter, whereas by the insertion of the green filter the exposure to blue light of the printing material is terminated and the exposure to red light of the printing material is temporarily interrupted. Moreever, with closing of the contact 52a the flow of current through the thyratron 49 persists.

As soon as the sum total of the exposure to green printing light, during the first filter-free exposure and during the subsequent exposure under the green filter, has attained to the value predetermined by the setting of the potentiometer tapping 56 and accordingly the time circuit capacitor 62 of the exposure regulating device 47 has reached the predetermined ignition potential, the valve 50 ignites and energizes the relay 53. Thereupon the contacts 53a, 53b, 53c are closed and the contact 53d is opened, which events have for their effect that the magnet 23 is deenergized and the magnet 24 is energized. Accordingly the green filter 17 is again withdrawn from the printing light beam and the red filter 18 becomes inserted therein. Exposure of the printing material therefore progresses under red light, flow of current through the thyratron 50 continuing.

As soon as the capacitor 63 of the regulating device 48 which controls the exposure to red light has become charged to a predetermined potential and thus the total quantity of red printing light, during the first filter-free exposure and during the second subsequent exposure, has attained to a predetermined value, the valve 51 also ignites, the relay 54 is energized and the contacts 54a, 54b, 54c are closed and the contact 54d is opened. As a result the relay 73 is again energized and the contacts 73a, 73b are returned to their original positions. Accordingly the shutter 29 is closed again and the exposure of the printing material is complete. In addition, the printing light source 1 is returned to its reduced output condition. Furthermore the magnet 24 is deenergized and thus the red filter removed from the printing light beam. The blue filter 19 does not become inserted since already prior to the above mentioned closing of the contact 54c the contact 52d has been opened again.

On ignition of the valves 49, 50, 51 and energizing of the relays 52, 53, 54 the capacitors 61, 62, 63 are short circuited and thus the grids of the valves are connected up to a negative potential with respect to the cathodes. However, the flow of current through the valves 49, 50, 51 continues in the manner known in the case of thyratrons.

Thus the initial condition of the whole of the control devices is again restored. The apparatus is now ready for a new color printing operation.

On connecting up the color printing apparatus to the mains 33, 34, prior to the first color printing operation the valves 49, 50, 51 and relays 52, 53, 54 are deenergized as compared with the above described ready-for-use condition. After operation of the release switch 75 and opening of the contacts 74a, 74b, 74c, however, the first printing operation proceeds in the manner above described.

The color printing operation proceeds in an analogous manner when the greatest transmission capacity of the color transparency is in the green spectral region and it is the valve 50 which ignites first. In this case, subsequently, the red filter 18 and the blue filter 19 are consecutively introduced into the printing light beam by means of the control devices 47, 48, 46. When, on the other hand, in the course of a color printing operation the valve 51 is the first one to be ignited, then subsequently the blue filter 19 and the green filter 17 are introduced consecutively into the printing light beam by means of the controls 48, 46, 47.

Accordingly each of the three color filters 17, 18, 19 may be selectively introduced first into the printing light beam depending on the color composition of the color transparency and according to the sensitivity of the photoelectric control devices 46, 47, 48 set by means of the potentiometers 58, 59, 60. After the first partial exposure of the printing material without insertion of a color filter there are two subsequent exposures under different additive filters.

The sequence of the insertions of the filters into the printing light beam is constant independent of the color composition of the color transparency. When in a printing operation the green filter and the red filter are used, then in the embodiment described above the green filter will always be inserted before the red filter. Similarly when the red and blue filters are used the red filter will always be inserted before the blue filter and when the blue and green filters are used the blue filter will always be used before the green filter.

However, the arrangement of the filters as regards the exposure devices may vary from that described above, for example, the exposure regulating device 46 with the blue sensitive photocell 11 may control the red filter 18, the exposure regulating device 47 with the green-sensitive photocell 12 may control the blue filter 19 and the exposure regulating device 48 with the red-sensitive photocell 13 may control the green filter 17. The sequence of the color exposures following the exposure to white light in a color printing operation is in this case correspondingly interchanged as compared with the control of the filters in the first embodiment described but the sum total of the effects is the same as regards the print obtained.

Obviously the thyratron valves in the contact devices 46, 47, 48 may be replaced by corresponding direct current amplifier connections with common electron tubes. In addition means may be provided for closing the shutter 29 for a short time during the replacement of the color filters in the printing light beam and only opening it again after completion of the said replacement. Instead of being located between the condenser lenses 2, 3, the color filters 17, 18, 19 may also be inserted at another point in the path of the printing light beam. Instead of the shown shiftable arrangement of the color filters 17, 18, 19, it is also possible to arrange said filters turnably about vertical or horizontal axes.

The arrangement of the photocells 11, 12, 13 is not limited to that particularly represented in FIG. 1. Instead of arranging the cells in the path of light behind the printing plane they may, for example, be arranged in the manner shown in FIG. 5 in the path of a semi-transparent mirror 81 arranged in the printing light beam, for example behind the objective 6. In front of the photocells 11, 12, 13 with their filters 14, 15, 16 there may also be arranged in known manner beam splitting means consisting of interference mirrors 82, 83.

This invention has the advantage that exposure of the color sensitive material to light of all of the basic colors commences simultaneously, so that the duration of the entire color printing process is very short and the color printing apparatus of the invention thus has a high working speed. In spite of this only one printing light source emitting light of all spectral regions is necessary. The additive filters employed are very easily produced and can be strictly limited as regards transmission capacity to one particular additive primary color so that the color printing apparatus of the invention gives very good color prints without color falsification.

In addition the color printing apparatus of the invention has the advantage of a relatively simple construction and great reliability in operation.

It will be understood that each of the elements described above, or two or more together, may also find a useful application in other types of photographic reproductions differing from the types described above.

While the invention has been illustrated and described as embodied in color photographic reproductions, it is not intended to be limited to the details shown, since various modifications and structural changes may be made without departing in any way from the spirit of the present invention. Especially the present invention may also be applied in contact printing apparatus.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process for making photographic color reproductions, the steps of projecting printing light including light components of three additive primary colors through the transparency to be printed upon a color-sensitive copy sheet for simultaneously exposing the copy sheet to light of all of said colors until the desired exposure to a first one of them is complete; then projecting printing light of only a second one of said colors to said copy sheet for further exposing it to light of said second color to produce a desired total exposure to light of said second color; and then, if necessary, projecting printing light of only the third one of said colors to said copy sheet for further exposing it to light of said third color to produce a desired total exposure to light of said third color, whereby exposure of the copy sheet to said third color is interrupted after completion of exposure to said first color and then resumed after completion of exposure to said second color.

2. In a photographic color printer having means for directing white light through a negative onto photographic multicolor sensitive material for the purpose of simultaneously exposing said material to the three primary colors, red, green and blue, means for determining when the exposure to any one of said primary colors has been substantially completed, means responsive solely to said determining means for subjecting said material to a single primary color printing light other than that for which exposure has been substantially completed, means for changing the color of the printing light to a different single primary color required to substantially complete an exposure not previously completed to a substantial extent, and means responsive to said determining means for precluding further exposure to any primary color for which exposure has been substantially completed.

3. In a color printer as recited in claim 2, said means for determining when the exposure to any one of said primary colors has been substantially completed including three photoelectric elements sensitive to said colors, respectively.

4. In a color printer as recited in claim 2, said means for changing the color of the printing light including a plurality of color filters and a plurality of solenoids respectively connected thereto for respectively moving the same between operative and inoperative positions.

5. In an apparatus for producing photographic color reproductions, in combination, a copy sheet support; directing means for directing light from a source of approximately white light along a given axis through a color transparency to said copy sheet support to expose a copy sheet thereon; a plurality of measuring means cooperating with the printing light for respectively measuring preselected amounts of light components of the primary colors which are applied to a copy sheet on the copy sheet support after passage through the transparency, so that according to the characteristics of the transparency the preselected amount of a light component of one primary color will be measured by one measuring means before a preselected amount of a light component of another primary color is measured by another measuring means; a plurality of additive color filters respectively corresponding to said primary colors; support means supporting said filters for movement to an operating position extending across said axis between said light source and copy sheet support; and moving means cooperating with said filters and responsive to said plurality of measuring means for automatically moving into said operating position, as soon as said one measuring means has measured said predetermined amount of said light component of said one primary color, the color filter corresponding to said other primary color, so that exposure of the copy sheet only to said other primary color continues after the copy sheet has been exposed to said preselected amount of said one primary color.

6. In an apparatus as recited in claim 5, said plurality of measuring means including, respectively, photocells for receiving light of said primary colors, and said moving means connecting the photocell of one color with a filter of a different color for moving the latter filter into said operating position after a predetermined amount of said one color has reached the latter photocell.

7. In an apparatus for producing photographic color reproductions, in combination, a source of approximately white printing light; a copy sheet support for supporting a light-sensitive copy sheet; directing means cooperating with said source and said support for directing light from said source along an optical axis through a transparency, which is to be printed, to a light-sensitive copy sheet carried by said support; first, second, and third additive color filters respectively corresponding to first, second, and third primary color components of said printing light; guide means guiding said filters for movement transversely of said axis into the path of printing light to an operating position between said source and said support; and first, second, and third exposure regulating assemblies respectively including first, second and third photoelectric elements which are respectively sensitive to said first, second and third primary color components of said white printing light, first, second and third moving means, and first, second and third actuating means respectively connecting said first, second and third photoelectric elements to said first, second and third moving means for respectively actuating the latter when said first, second and third photoelectric elements respectively receive preselected amounts of said first, second and third primary color components of said white printing light, said first moving means being operatively connected to one of said second and third filters for moving said one filter into said path of light when said first photoelectric element receives a preselected amount of said first primary color component of said white printing light, said second moving means being operatively connected to another of said filters, which is one of said first and third filters, for moving said other filter into said path when said second photoelectric element receives a preselected amount of said second primary color component of said white printing light, said third filter being the filter connected to one of said first and second moving means, and said third moving means being operatively connected to the remaining one of said filters for moving said remaining filter into said path when said third photoelectric element receives a preselected amount of said third primary color component of said white printing light, whereby, according to the characteristics of the transparency, one of said photoelectric elements of one of said assemblies will receive its preselected amount of light of one primary color component before the remaining photoelectric elements receive their preselected amounts of the remaining color components, respectively, to cause the actuating means of said one assembly to actuate the moving means of said one assembly for moving into said path a filter corresponding to a color component different from said one primary color component to continue the exposure of the copy sheet to said different color component upon termination of its exposure to said one color component and to interrupt the exposure of the copy sheet to the remaining color component, the photoelectric element which is sensitive to said different color component, upon receiving its preselected amount of light of said different color component, actuating through said actuating means connected thereto the moving means connected to said latter actuating means for moving the color filter corresponding to said remaining color component into said path to resume and complete the exposure of the copy sheet to said remaining color component.

8. In an apparatus as recited in claim 7, said filters being arranged in a row beside the optical axis for respective movement in separate planes normal to said axis to and from said operating position extending across said axis.

9. In an apparatus as recited in claim 7, said directing means including a condenser having a pair of lenses spaced from each other along the optical axis and said filters being respectively located in the space between said lenses when each filter is in its operating position.

10. In an apparatus as recited in claim 7, said first, second and third moving means respectively including first, second and third electromagnets respectively cooperating with said first, second and third actuating means and with said filters for respectively moving the latter into said printing light path when said electromagnets are energized.

11. In an apparatus as recited in claim 7, a shutter located adjacent said light source to obscure the printing light and means for opening the shutter at the commencement of a printing operation and closing it at the end thereof.

12. In an apparatus as recited in claim 11, a double winding electromagnet device being provided for opening and closing the shutter.

13. In an apparatus as recited in claim 7, each exposure regulating assembly including an electric circuit with a relay for contact operation, one contact operable by a relay in one exposure regulating assembly being located in a circuit of another exposure regulating assembly so that a cycle of contacts exists resulting in a fixed sequence of insertion of the color filters starting from any one of them.

14. In an apparatus as recited in claim 13, said one contact being in series with a contact operable by the relay of the same exposure regulating assembly to remove the filter corresponding to that exposure regulating assembly.

15. In an apparatus as recited in claim 13, further contacts being provided each operable by one only of said relays and arranged in series with one another and with a relay for operating a printing light contact to change its intensity from a low rating for inspection to a high rating for printing.

16. In an apparatus as recited in claim 15, a shutter located adjacent the light source to obscure the printing light, the printing light relay being also adapted to operate a contact in a circuit for opening and closing said shutter.

17. In an apparatus as recited in claim 16, the shutter operating circuit including alternative paths to electromagnetic means for opening and closing the shutter respectively while the printing light is set to the rating for inspection, and including a changeover switch from one path to the other.

18. In an apparatus as recited in claim 7, a starter switch being arranged to energize a relay for controlling contacts in a circuit of each of the exposure regulating assemblies.

19. In an apparatus for producing photographic color reproductions, in combination, a source of approximately white printing light; a copy sheet support for supporting a light-sensitive copy sheet; directing means cooperating with said source and said support for directing light from said source along an optical axis through a transparency, which is to be printed, to a light-sensitive copy sheet carried by said support; first, second, and third additive color filters respectively corresponding to first, second, and third primary color components of said printing light; guide means guiding said filters for movement transversely of said axis into the path of printing light to an operating position between said source and said support; and first, second, and third exposure regulating assemblies respectively including first, second and third photoelectric elements which are respectively sensitive to said first, second and third primary color components of said white printing light, first, second and third moving means operatively connected to said second, third and first filters, respectively, and a plurality of actuating means respectively connected operatively to said first, second and third photoelectric elements and to said first, second and third moving means for actuating the latter to move said second, third, and first filters, respectively, when said first, second and third photoelectric elements respectively receive preselected amounts of said first, second and third primary color components, whereby, according to the characteristics of the transparency, one of said photoelectric elements of one of said assemblies will receive its preselected amount of light of one primary color component before the remaining photoelectric elements receive their preselected amounts of the remaining color components, respectively, to cause the actuating means of said one assembly to actuate the moving means of said one assembly for moving into said path a filter corresponding to a color component different from said one primary color component to continue the exposure of the color sheet to said different color upon termination of its exposure to said one color component and to interrupt the exposure of the copy sheet to the remaining color component, the photoelectric element which is sensitive to said different color component, upon receiving its preselected amount of light of said different color component, actuating through the actuating means connected thereto the moving means connected to the latter actuating means for moving the color filter corresponding to said remaining color component into said path to resume and complete the exposure of the copy sheet to said remaining color component.

20. In a photographic color printer having means for directing white light through a negative onto photographic multicolor sensitive material for the purpose of simultaneously exposing said material to the three primary colors, red, green and blue, a plurality of measuring means for respectively measuring preselected amounts of light components of the primary colors which are applied to the photographic material after passing through the negative whereby said means determine when the exposure to any one of said primary colors has been substantially completed, means responsive solely to said measuring means for subjecting said material to a single primary color printing light other than that for which exposure has been substantially completed, means for changing the color of the printing light to a different single primary color required to substantially complete an exposure not previously completed to a substantial extent, and means responsive to said measuring means for precluding further exposure to any primary color for which exposure has been substantially completed.

21. In a photographic color printer, in combination, a copy material support for supporting photographic multicolor sensitive copy material, means for directing white light through a negative onto said copy material support to expose said material supported thereon to the three primary colors, red, green and blue, means for determining when the exposure of the copy material to any one of said primary colors has been substantially completed, means responsive solely to said determining means for subjecting said material to a single primary color printing light other than that for which exposure has been substantially completed, means for changing the color of the printing light to a different single primary color required to substantially complete an exposure not previously completed to a substantial extent, and means responsive to said determining means for precluding further exposure to any primary color for which exposure has been substantially completed.

22. In a photographic color printer having means for directing white light through a negative onto photographic multicolor sensitive material for the purpose of simultaneously exposing said material to the three primary colors, red, green and blue, means for determining when the exposure to any one of said primary colors has been substantially completed, first color filter means responsive solely to said determining means for subjecting said material to a single primary color printing light other than that for which exposure has been substantially completed, second color filter means for changing the color of the printing light to a different single primary color required to substantially complete an exposure not previously completed to a substantial extent, and means responsive to said determining means for precluding further exposure to any primary color for which exposure has been substantially completed.

23. In a photographic color printer having means for directing white light from a source along a given axis through a negative onto photographic multicolor sensitive material for the purpose of simultaneously exposing said material to the three primary colors, red, green and blue, means for determining when the exposure to any one of said primary colors has been substantially completed, first color filter means movable into and out of an operating position extending across said axis between said source of light and said sensitive material, first moving means cooperating with said first color filter means responsive to said determining means for automatically moving said first color filter means into said operating position subjecting said material to a single primary color printing light other than that for which exposure has been substantially completed as determined by said determining means, second color filter means, movable into and out of an operating position extending across said axis between said source of light and said sensitive material, second moving means cooperating with said second color filter means and responsive to said determining means for automatically moving said second color filter means into said last-mentioned operating position for changing the color of the printing light to a different single primary color required to substantially complete an exposure not previously completed to a substantial extent as determined by said determining means, and means responsive to said determining means for precluding further exposure to any primary color for which exposure has been substantially completed.

References Cited by the Examiner

UNITED STATES PATENTS

| 2,500,049 | 3/1950 | Williams et al. | 88—24 |
| 2,742,837 | 4/1956 | Streiffert | 88—24 |
| 2,997,389 | 8/1961 | Boon | 88—24 |

FOREIGN PATENTS

| 1,135,521 | 12/1956 | France. |
| 1,173,295 | 10/1958 | France. |

NORTON ANSHER, *Primary Examiner.*

EMIL G. ANDERSON, *Examiner.*